United States Patent
Suddaby

(10) Patent No.: US 12,196,171 B2
(45) Date of Patent: Jan. 14, 2025

(54) WAVE ENERGY CAPTURE AND CONVERSION DEVICE

(71) Applicant: Loubert S. Suddaby, Orchard Park, NY (US)

(72) Inventor: Loubert S. Suddaby, Orchard Park, NY (US)

( * ) Notice: Subject to any disclaimer, the term of this patent is extended or adjusted under 35 U.S.C. 154(b) by 57 days.

(21) Appl. No.: 18/162,815

(22) Filed: Feb. 1, 2023

(65) Prior Publication Data
US 2024/0141860 A1     May 2, 2024

Related U.S. Application Data

(63) Continuation-in-part of application No. 18/058,782, filed on Nov. 25, 2022, now Pat. No. 11,959,452, which is a continuation-in-part of application No. 18/051,115, filed on Oct. 31, 2022, now Pat. No. 11,867,144.

(51) Int. Cl.
    *F03B 13/14*        (2006.01)

(52) U.S. Cl.
    CPC .................................. *F03B 13/142* (2013.01)

(58) Field of Classification Search
    CPC ......... F03B 13/142; F03B 13/20; Y02E 10/30
    See application file for complete search history.

(56) References Cited

U.S. PATENT DOCUMENTS

| | | | |
|---|---|---|---|
| 332,875 A * | 12/1885 | Bussard et al. | F03G 1/00 185/39 |
| 123,448 A | 2/1889 | Brooks | |
| 998,756 A * | 7/1911 | Dean | F16H 55/283 74/422 |
| 1,371,836 A | 3/1921 | Antz | |
| 2,027,597 A * | 1/1936 | Lide | B03B 5/24 209/455 |
| 2,494,165 A | 1/1950 | Pierre | |
| 3,064,137 A * | 11/1962 | Corbett, Jr. | F03B 13/142 290/54 |
| 3,567,953 A * | 3/1971 | Lord | F03B 13/262 290/53 |

(Continued)

FOREIGN PATENT DOCUMENTS

| | | |
|---|---|---|
| DE | 102017008478 | 3/2019 |
| EP | 1930597 | 6/2008 |

(Continued)

OTHER PUBLICATIONS

Christos Charisiadis, An introductory presentation to the "Archimedean Screw" as a low Head Hydropower Generator, WATENV, 2015.

(Continued)

*Primary Examiner* — Pedro J Cuevas
(74) *Attorney, Agent, or Firm* — Harter Secrest & Emery LLP; Michael Nicholas Vranjes

(57) ABSTRACT

A wave energy capture and conversion assembly, including a tube forming a chamber, and a point absorber arranged in the chamber, wherein the tube is operatively arranged to engage water to form an oscillating water column within the chamber, and the oscillating water column engages the point absorber to displace a first shaft in a first circumferential direction.

19 Claims, 4 Drawing Sheets

(56) References Cited

U.S. PATENT DOCUMENTS

| | | | | |
|---|---|---|---|---|
| 3,668,412 | A * | 6/1972 | Vrana | F03B 13/262 |
| | | | | 290/53 |
| 3,959,663 | A * | 5/1976 | Rusby | F03B 13/262 |
| | | | | 60/497 |
| 4,228,360 | A * | 10/1980 | Navarro | F03B 13/1885 |
| | | | | 290/43 |
| 4,242,593 | A * | 12/1980 | Quilico | F03B 13/1885 |
| | | | | 290/53 |
| 4,249,085 | A * | 2/1981 | Kertzman | F03B 13/262 |
| | | | | 60/497 |
| 4,286,347 | A * | 9/1981 | Modisette | F03B 13/142 |
| | | | | 60/398 |
| 4,355,511 | A * | 10/1982 | Jones | F03B 13/1845 |
| | | | | 60/507 |
| 4,599,858 | A * | 7/1986 | La Stella | F03B 13/186 |
| | | | | 60/497 |
| 4,719,754 | A * | 1/1988 | Nishikawa | F03B 13/142 |
| | | | | 417/100 |
| 5,191,225 | A * | 3/1993 | Wells | F01D 5/34 |
| | | | | 417/100 |
| 5,424,582 | A * | 6/1995 | Trepl, II | F03B 13/1865 |
| | | | | 60/507 |
| 5,929,531 | A * | 7/1999 | Lagno | F03B 13/262 |
| | | | | 417/330 |
| 6,083,382 | A | 7/2000 | Bird | |
| 6,216,455 | B1 * | 4/2001 | Doleh | F03B 13/183 |
| | | | | 60/398 |
| 6,220,425 | B1 | 4/2001 | Knapp | |
| 6,389,810 | B1 * | 5/2002 | Nakomcic | F03B 13/186 |
| | | | | 60/497 |
| 6,711,897 | B2 * | 3/2004 | Lee | F03B 13/1815 |
| | | | | 60/507 |
| 7,152,556 | B2 | 12/2006 | Goltsman | |
| 7,355,298 | B2 * | 4/2008 | Cook | F03B 13/148 |
| | | | | 290/53 |
| 7,791,213 | B2 * | 9/2010 | Patterson | F03B 13/1865 |
| | | | | 60/504 |
| 7,830,032 | B1 * | 11/2010 | Breen | F03B 13/142 |
| | | | | 290/55 |
| 7,969,033 | B2 * | 6/2011 | Ryan | F03B 17/04 |
| | | | | 60/497 |
| 8,004,103 | B2 * | 8/2011 | Brantingham | F03B 13/1845 |
| | | | | 290/53 |
| 8,097,150 | B1 * | 1/2012 | Houser | F03B 13/187 |
| | | | | 210/321.66 |
| 8,276,377 | B2 * | 10/2012 | Patton | F03B 13/262 |
| | | | | 60/507 |
| 8,299,637 | B2 * | 10/2012 | Wittorf | F01K 27/00 |
| | | | | 60/527 |
| 8,441,139 | B2 * | 5/2013 | Karimi | F03D 9/007 |
| | | | | 290/44 |
| 8,581,433 | B2 * | 11/2013 | Sidenmark | F03B 13/1815 |
| | | | | 290/53 |
| 8,629,572 | B1 * | 1/2014 | Phillips | F03B 13/16 |
| | | | | 290/53 |
| 8,791,588 | B2 * | 7/2014 | Steinlechner | F03D 15/10 |
| | | | | 290/55 |
| 9,062,649 | B2 * | 6/2015 | Greco | F28D 7/16 |
| 9,068,551 | B2 * | 6/2015 | Sidenmark | F03B 13/20 |
| 9,279,407 | B2 | 3/2016 | Sinclaire | |
| 9,309,860 | B2 | 4/2016 | Hon | |
| 9,322,278 | B2 | 4/2016 | Hindle et al. | |
| 9,759,180 | B2 | 9/2017 | Russo | |
| 10,028,444 | B2 | 7/2018 | McCully et al. | |
| 10,161,379 | B2 * | 12/2018 | Nanehkaran | E02B 9/08 |
| 10,400,741 | B2 * | 9/2019 | Gregory | F03B 13/188 |
| 10,415,539 | B1 * | 9/2019 | Osterman | E02B 9/08 |
| 10,608,502 | B2 * | 3/2020 | Rama Raju | F03G 7/10 |
| 10,619,620 | B2 * | 4/2020 | Skjoldhammer | F03B 13/1875 |
| 10,634,113 | B2 * | 4/2020 | Sheldon-Coulson | F03B 13/24 |
| 11,028,819 | B2 * | 6/2021 | Sheldon-Coulson | H02K 5/04 |
| 11,084,558 | B2 * | 8/2021 | Robinson | F03D 13/25 |
| 11,346,319 | B2 * | 5/2022 | Huang | B63B 59/02 |
| 11,421,645 | B1 | 8/2022 | Suddaby | |
| 11,459,997 | B2 | 10/2022 | Parsa et al. | |
| 11,536,241 | B2 * | 12/2022 | Qu | F03B 13/1885 |
| 11,815,061 | B2 * | 11/2023 | Johnstone | F03B 13/262 |
| 2002/0078687 | A1 | 6/2002 | Donnelly | |
| 2005/0035602 | A1 * | 2/2005 | Gard | F03B 13/262 |
| | | | | 290/53 |
| 2007/0108774 | A1 * | 5/2007 | Estes | F03B 13/262 |
| | | | | 290/53 |
| 2007/0130929 | A1 * | 6/2007 | Khan | F03B 13/185 |
| | | | | 60/398 |
| 2008/0260548 | A1 * | 10/2008 | Ahdoot | F03B 13/186 |
| | | | | 417/552 |
| 2009/0121486 | A1 * | 5/2009 | Ganley | F03B 13/262 |
| | | | | 290/53 |
| 2010/0266406 | A1 | 10/2010 | Eielsen | |
| 2011/0187102 | A1 * | 8/2011 | Sirseth | F03B 13/1815 |
| | | | | 60/502 |
| 2012/0112472 | A1 * | 5/2012 | Murray | F03B 13/1845 |
| | | | | 290/1 R |
| 2012/0167563 | A1 | 7/2012 | Cherepashenets et al. | |
| 2013/0082465 | A1 * | 4/2013 | Frich | F16D 31/02 |
| | | | | 290/53 |
| 2013/0134715 | A1 | 5/2013 | Sinclaire | |
| 2013/0302174 | A1 | 11/2013 | Hindle et al. | |
| 2014/0110494 | A1 | 4/2014 | Mills et al. | |
| 2014/0265337 | A1 | 9/2014 | Harding et al. | |
| 2016/0368006 | A9 | 12/2016 | Mills et al. | |
| 2021/0301777 | A1 | 9/2021 | Parsa et al. | |

FOREIGN PATENT DOCUMENTS

| | | |
|---|---|---|
| EP | 3892848 | 10/2021 |
| FR | 2457989 | 12/1980 |
| GB | 2361749 | 10/2001 |
| KR | 102271940 | 7/2021 |
| WO | 2010082129 | 7/2010 |
| WO | 2015150194 | 10/2015 |
| WO | 2023025678 | 3/2023 |

OTHER PUBLICATIONS

Archimedes Screw Generators, GreenBug Energy Inc., 2020.

* cited by examiner

WAVE ENERGY CAPTURE AND CONVERSION DEVICE

CROSS-REFERENCE TO RELATED APPLICATIONS

This application is filed under 35 U.S.C. § 120 as a continuation-in-part of U.S. patent application Publication Ser. No. 18/058,782, filed on Nov. 25, 2022, which application is a continuation-in-part of U.S. patent application Ser. No. 18/051,115, filed on Oct. 31, 2022, which applications are hereby incorporated by reference in their entireties.

FIELD

The present disclosure relates to wave energy capture devices, and more particularly, to shore-based devices including a chamber arranged to create a water column and a motion conversion device to convert wave energy into electricity.

BACKGROUND

Energy is the life blood of any advanced society and the quest to achieve an endless supply of energy has become an obsession in the extreme. While fossil fuels were once considered the holy grail for fueling a modern mechanized society, the oil crises of the 1970's and 1980's and the more recent concerns of carbon emissions and their impact on global climate change have brought significant and sobering realities regarding the procurement of energy through the combustion of fossil fuels.

The ocean is undoubtedly the largest solar panel on the planet covering 70% of the earth's surface. Additionally, wave energy contains one of the densest forms of natural energy available on earth. From a pure energy perspective, the ocean is unquestionably the greatest storehouse of energy on earth, with the theoretical annual energy production of waves off the costal United States estimated to be as much as 2.64 trillion kilowatt hours.

Current shore-based conversion devices rely on the sinusoidal action of waves to compress air, which in turn drives a power takeoff mechanism relying on pneumatics to power a generator or, ironically, a wind turbine. However, because air is compressible and much less dense than water, and because the blades of self-rectifying turbines are not optimized to capture maximal air flow, significant energy losses occur through the conversion of powerful linear oscillatory wave energy to the rotary energy needed to turn an axel and generate electricity. While electromechanical means of optimizing blade angles of "self-rectifying" turbines have been proposed, these modulations add a layer of complexity that does not fare well in a marine environment.

Thus, there is a long-felt need for a shore-based wave energy capture and conversion device that can directly transfer the kinetic energy inherent in wave motion to the constant rotary motion of an axel to generate electrical energy.

SUMMARY

According to aspects illustrated herein, there is provided a wave energy capture and conversion assembly, comprising a tube forming a chamber, and a point absorber arranged in the chamber, wherein the tube is operatively arranged to engage water to form an oscillating water column within the chamber, and the oscillating water column engages the point absorber to displace a first shaft in a first circumferential direction.

In an exemplary embodiment, the chamber comprises a first section comprising an opening, and a second section connected and arranged substantially perpendicular to the first section, the point absorber being arranged in the second section. In an exemplary embodiment, the first section is arranged substantially horizontal and the second section is arranged substantially vertical. In an exemplary embodiment, the first section decreases in width in a first direction from the opening. In an exemplary embodiment, the first section decreases in height in the first direction. In an exemplary embodiment, the opening comprises an ovular geometry.

In an exemplary embodiment, the point absorber comprises a float operatively arranged to engage the oscillating water column and displace axially in the chamber. In an exemplary embodiment, the assembly further comprises a linear generator including a magnet arranged in or on the float, and a coil concentrically arranged around the magnet. In an exemplary embodiment, the point absorber further comprises a reciprocating element pivotably connected to the float, a wheel, and a line engaged with the reciprocating element and the wheel. In an exemplary embodiment, the reciprocating element comprises at least one pawl operatively arranged to engage the line as the reciprocating element is displaced in a first direction, and disengage the line as the reciprocating element is displaced in a second direction, opposite the first direction. In an exemplary embodiment, the reciprocating element comprises a first pawl operatively arranged to engage the line as the reciprocating element is displaced in the first direction, and disengage the line as the reciprocating element is displaced in the second direction, and a second pawl operatively arranged to disengage the line as the reciprocating element is displaced in the first direction, and engage the line as the reciprocating element is displaced in the second direction.

In an exemplary embodiment, the at least one pawl engages a radially outward facing surface of the line. In an exemplary embodiment, the point absorber further comprises a spacer engaged with a radially inward facing surface of the line. In an exemplary embodiment, the at least one pawl engages a radially inward facing surface of the line. In an exemplary embodiment, the first shaft is connected to a rotary generator. In an exemplary embodiment, the assembly further comprises a motion conversion device including a plurality of propellers arranged in the chamber, wherein the plurality of propellers are operatively arranged to displace a second shaft circumferentially.

According to aspects illustrated herein, there is provided a wave energy capture and conversion assembly, comprising a tube forming a chamber, the chamber including a first section comprising an opening and a second section, and a point absorber arranged in the second section, the point absorber including a float axially displaceable within the second section, wherein the tube is operatively arranged to engage water to form an oscillating water column within the chamber, and the oscillating water column is operatively arranged to displace the point absorber axially to displace a shaft in a first circumferential direction.

In an exemplary embodiment, the first section decreases in geometry in a first direction from the opening. In an exemplary embodiment, the point absorber further comprises a wheel connected to first shaft, a reciprocating element pivotably connected to the float, and a line engaged with the wheel and the reciprocating element. In an exemplary embodiment, the second section is arranged substantially perpendicular to the first section.

According to aspects illustrated herein, there is provided an energy capture and conversion mechanism including an oscillating water column design utilizing a linear generator and/or a piston pawl chain mechanism to convert the linear oscillatory motion of collected wave energy into electrical power, for example, using an electrical generator. In an exemplary embodiment, the energy capture and conversion mechanism comprises caissons used in corralling incident waves and swells. The caissons may comprise sloping side walls and floors that compress flowing water to increase and accelerate linear vector forces.

According to aspects illustrated herein, there is provided an oscillating column wave energy capture device including a caisson optimized to the bathymetry of the shoreline on which it is placed. In an exemplary embodiment, the device comprises a littoral portal being large and substantially parallel to incident waves, and the combined confines of the floor and walls gradually narrow in a funnel like shape to optimize the compression of waves and minimize turbulence or reflection which diminishes wave energy. In an exemplary embodiment, the littoral portal comprises an oval and frustoconical shape, as of a compressed cone with its widest dimension parallel to the incident oncoming waves. In an exemplary embodiment, the chamber gradually narrows in a diminishing frustoconical fashion designed to maximally concentrate wave energy while simultaneously minimizing wave refraction or reflection of propagating waves such that optimal wave energy concentration and conveyance is fostered and maximal wave energy transference to the point absorber/power take off device is assured. The distal narrowed portion of the cone shall turn upward and upon becoming vertical assume a cylindrical column. Because different shorelines and latitudes have characteristically different wave forms, the exact size and shape of the littoral aperture as well as the final column aperture size and length can be optimized with computer modelling to obtain a customized product. A float is arranged in the column and is driven up and down by the motion of the water in the column.

The float may comprise ballast, which may simply be material of weight to enhance the oscillatory motion of the float on its downward power stroke. In an exemplary embodiment, the float comprises one or more large magnets wherein movement of the one or more magnets will serve as a linear electrical generator rotor. In an exemplary embodiment, the float contained within the column may ride on rails which guide it, but which are made of electrical grade steel and serve as stators as well as guide rails whereby the up and down movement of the float directly generates electrical energy.

In an exemplary embodiment, a stem is connected to the top of the float and a piston which comprises a plurality of pawls that engage the links of a chain or toothed belt which is strung around two sprockets of substantially similar size. The pawls may be equal size and are fixedly secured at two points distal from each other. The chain can be contained within groves in the side wall to prevent bowing outward. The pawls on one side of the piston engage the chain on the upstroke but fold in or disengage on the downstroke whereas the pawls on the other side of the piston engage the chain on the downstroke but fold in or disengage on the upstroke permitting only unidirectional movement of the chain by both the up and down strokes of the oscillatory motion of the piston. Because of the engagement of the pawls with the chain, all magnitudes of oscillation can be captured and turned to rotational energy unlike a piston crank shaft arrangement where a complete excursion of the piston is required. In an exemplary embodiment, the piston pawl chain component is located above the float within the column such that it operates in air and is largely protected from the marine environment. While the lower sprocket serves mainly as a guide for the revolving chain, the upper sprocket is attached to an axel or shaft which in turn connects to a freewheel or freehub supported flywheel to smooth out energy transfer from the aforementioned power take off assembly. Utilizing simple gearing, the speed of final rotation can be optimized to generate the constant rotatory motion necessary to turn an electric generator. In this fashion, both the linear motion of the point absorber and the converted rotary motion can be captured and converted to electricity.

These and other objects, features, and advantages of the present disclosure will become readily apparent upon a review of the following detailed description of the disclosure, in view of the drawings and appended claims.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure, in which corresponding reference symbols indicate corresponding parts. However, the drawings do not illustrate all possible implementations of the presently disclosed subject matter and are not intended to limit the scope of the present disclosure in any way.

DETAILED DESCRIPTION

Figure 1:
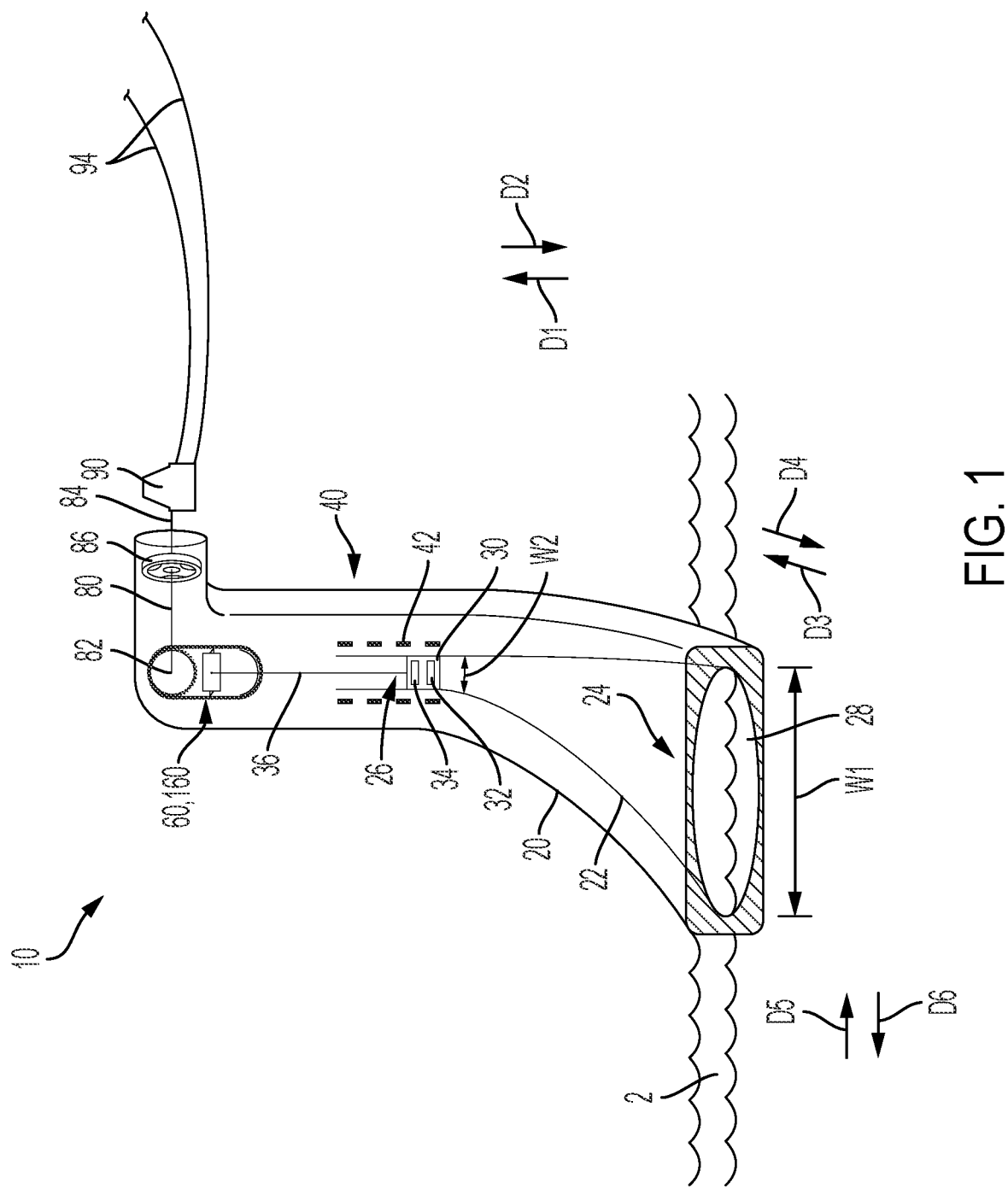
FIG. 1 is a perspective view of a wave energy capture and conversion assembly.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element. A similar interpretation is intended when the phrase "used in at least one of:" is used herein.

By "non-rotatably connected" elements, it is meant that: the elements are connected so that whenever one of the elements rotate, all the elements rotate; and relative rotation between the elements is not possible. Radial and/or axial movement of non-rotatably connected elements with respect to each other is possible, but not required. By "rotatably connected" elements, we mean that: the elements are rotatable with respect to each other.

Point absorber as used herein is intended to mean a mechanism that converts the motion or movement of water (i.e., oscillatory movement of water or the flow of water) into rotary motion (i.e., rotational displacement).

Adverting now to the figures, FIG. 1 is a perspective view of wave energy capture and conversion assembly 10, generally designated assembly 10. Assembly 10 generally comprises tube 20 and at least one motion conversion device, for example motion conversion device or point absorber 60, 160. In an exemplary embodiment, assembly 10 further comprises at least one generator, for example, linear generator or alternator 40 and/or rotary generator 90.

Figure 2:
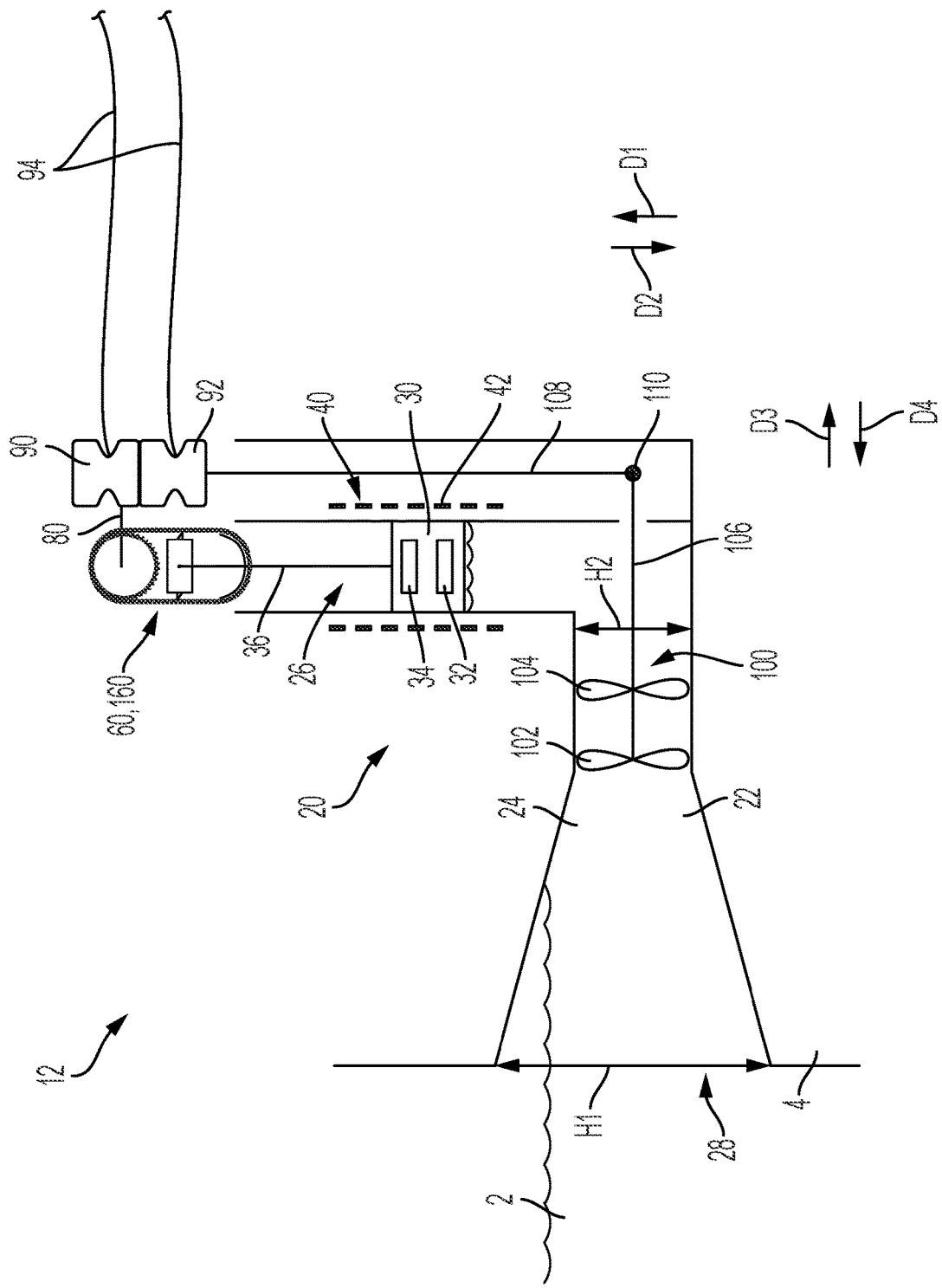
FIG. 2 is an elevational view of a wave energy capture and conversion assembly.

Tube 20 is operatively arranged to engage water or fluid 2 so as to form an oscillating water column. Tube 20 forms collection chamber 22, which comprises section 24 and section 26. Section 24 is substantially horizontal and extends from opening 28 in direction D3. Section 26 is substantially vertical and extends from section 24 in direction D1. In an exemplary embodiment, section 26 is cylindrical. In an exemplary embodiment, chamber 22 is frusto-conical and decreases in diameter from opening 28 in direction D3 (i.e., chamber 22 comprises its largest diameter at opening 28). In an exemplary embodiment, and as best shown in FIG. 1, opening 28 comprises width W1 and section 26 comprises width W2, wherein width W1 is greater than width W2. In an exemplary embodiment, and as best shown in FIG. 2, chamber 22 decreases in height from opening 28, which comprises height H1, to height H2. The decrease in cross-sectional area of chamber 22 from opening 228 causes a more sensitive fluctuation of water level in section 26. Put another way, a small amount of water movement in direction D3 and direction D4, into opening 28, will cause a large amount of water movement in direction D1 and direction D2 in section 26, respectively. This ultimately results in more oscillatory movement of water in section 26 and thus float 30, as will be described in greater detail below.

In an exemplary embodiment, opening 28 comprises an ovular geometry in the direction D5 and direction D1 plane. In an exemplary embodiment, section 24 comprises an ovular geometry in the direction D5 and direction D1 plane. In an exemplary embodiment, while section 24 is substantially horizontal, a distal narrowed portion of section 24, opposite opening 28, is curvilinear and turns upward in direction D1.

Float 30 is arranged in chamber 22, specifically section 26, and is driven in direction D1 and direction D2 by the motion of water 2 therein. Float 30 is connected to motion conversion device 60, 160 via shaft 36. In an exemplary embodiment, float 30 is pivotably connected to shaft 36. It should be appreciated that the motion of water 2 within section 26 is referred to as an oscillating water column. Thus, chamber 22 and moving water 2 form an oscillating water column. Water 2 rising in section 26 is known as a rising water column. Water 2 falling in section 26 is known as a falling water column. Therefore, it is the action of the oscillating water column that displaces float 30 in directions D1 and D2 in section 26.

In an exemplary embodiment, float 30 comprises ballast or weight 32. Ballast 32 comprises a heavy material such as but not limited to gravel, sand, iron, lead, or the like to add mass to float 30. The added mass of ballast 32 causes float 30 to rapidly displace in direction D2 during the falling water column, thereby imparting a greater downstroke force on motion conversion device 60, 160.

In an exemplary embodiment, assembly 10 further comprises linear generator or alternator 40. Linear alternator 40 is a linear electrical generator comprising coil 42 and at least one magnet 34. Coil 42 is arranged on or in tube 20, for example, concentrically around section 26 of chamber 22. Magnet 34 is arranged on or in float 30 and thus displaces in direction D1 and direction D2 as a result of the oscillating water column. Specifically, magnet 34 displaces in directions D1 and D2 within coil 42, which changes the magnetic flux passing through coil 42 and induces the flow of an electric current, which can be used to do work (i.e., electricity). Linear alternator 40 converts back-and-forth linear motion of float 30, via magnet 34, into electrical energy, which may be transported via power lines 94.

In an exemplary embodiment, assembly 10 further comprises generator 90. Generator 90 is a rotary electrical generator connected to motion conversion device 60, 160 via shaft 80. Shaft 80 comprises end 82 connected to motion conversion device 60, 160 and end 84 connected to generator 90. Shaft 80 is operatively arranged to deliver rotational motion to generator 90, such that generator 90 produces electricity. Such electricity may be transported via power lines or electrical connectors 94. End 82 may be connected to motion conversion device 60, 160 via a freewheel device or connection. By freewheel connection, it is meant that as motion conversion device 60, 160, for example gear 74, 174, displaces in a first circumferential direction, shaft 80 displaces in the first circumferential, but when gear 74, 176 stops moving, shaft 80 may continue to displace in the first circumferential direction.

An example of a freewheel device or connection comprises two saw-toothed, spring-loaded discs pressing against each other with the toothed sides together, somewhat like a ratchet. Rotating in one direction, the saw teeth of the drive disc lock with the teeth of the driven disc, making it rotate at the same speed. If the drive disc slows down or stops rotating, the teeth of the driven disc slip over the drive disc teeth and continue rotating, producing a characteristic clicking sound proportionate to the speed difference of the driven gear relative to that of the (slower) driving gear.

Another example of a freewheel device or connection comprises spring-loaded steel rollers or detents inside a driven cylinder. Rotating in one direction, the rollers lock with the cylinder making it rotate in unison. Rotating slower, or in the other direction, the steel rollers just slip inside the cylinder.

Another example of a freewheel device or connection, and that used in most bicycle freewheels, comprises an internally step-toothed drum with two or more spring-loaded, hardened steel pawls to transmit the load. More pawls help spread the wear and give greater reliability although, unless the device is made to tolerances not normally found in bicycle components, simultaneous engagement of more than two pawls is rarely achieved.

In an exemplary embodiment, shaft 80 may further comprise flywheel 86. Flywheel 86 serves to smooth out the pulses of energy provided by motion conversion device 60, 160, and store energy for when motion conversion device 60, 160 is no longer supplying energy. For example, when gear 74, 176 stops moving, the energy stored in flywheel 86, as well as the freewheel connection between end 82 and motion conversion device 60, 160, will continue to rotate shaft 80 due to the energy stored in flywheel 86, thereby continuing to produce electricity via generator 90. Motion conversion device 60, 160 will be described in greater detail below.

FIG. 2 is an elevational view of wave energy capture and conversion assembly 12, generally designated assembly 12. Assembly 12 may comprise many of the same components as assembly 10. Assembly 12 generally comprises tube 20 and at least one motion conversion device, for example motion conversion device or point absorber 60, 160 and/or motion conversion device 100. In an exemplary embodiment, assembly 12 further comprises at least one generator, for example, rotary generator 90 and/or rotary generator 92. In an exemplary embodiment, assembly 12 may further comprise a linear generator, for example, linear generator 40. In addition to the energy conversion provided by float 30, motion conversion device 60, 160, and generators 40 and 90, assembly 12 comprises motion conversion device 100. In an exemplary embodiment, assembly 12 only comprises motion conversion device 100, as described below.

Motion conversion device 100 comprises a plurality of propellers, for example propeller 102 and propeller 104, shaft 106, and shaft 108. Shaft 106 is arranged substantially horizontal in section 24 of chamber 22, extending in direction D4 from connection 110. Shaft 108 is non-rotatably connected to shaft 106 via connection 110. Connection 110 may comprise any connection means suitable for non-rotatably connecting shaft 108 with shaft 110, for example, a bevel gear or geared connection. In an exemplary embodiment, shaft 108 is substantially vertical extending in direction D1 from connection 110.

Propellers 102 and 104 are operatively arranged to engage water 2 flowing in and out of chamber 22. Specifically, one of propellers 102 and 104 is arranged to engage water 2 flowing in direction D3 to rotate shaft 106 in a first circumferential direction, and disengage water 2 flowing in direction D4. The other of propellers 102 and 104 is arranged to engage water 2 flowing in direction D4 to rotate shaft 106 in a first circumferential direction, and disengage water 2 flowing in direction D3. Thus, propellers 102 and 104 are operatively arranged to engage the oscillating flow of water 2 in directions D3 and D4 within chamber 22 and displace shaft 106 only in a first circumferential direction. To achieve this end, in an exemplary embodiment, propellers 102 and 104 are hingedly connected to shaft 106, for example as in U.S. Patent Application Publication No. 2022/0325689 (Suddaby), which publication is incorporated herein by reference in its entirety. Since shaft 106 is only displaced in a single circumferential direction via the arrangement of propellers 102 and 104, shaft 108 also only displaces in a single circumferential direction. Shaft 108 is connected to generator 92 which converts the rotary motion of shaft 108 into electricity, which may be transported via power lines 94. In an exemplary embodiment, shaft 108 may be connected to generator 90 such that both motion conversion device 60, 160 and motion conversion assembly 100 feed rotary motion to generator 90.

By using two motion conversion devices 60, 160 and 100, greater energy can be produced. Additionally, since motion conversion devices 60, 160 and 100 are arranged in different portions of the oscillating water column, a greater efficiency is achieved. For example, motion conversion device 60, 160 is arranged in section 26 which is substantially vertical, and motion conversion device 100 is arranged in section 24 which is substantially horizontal. In instances of low tide, for instance, where water 2 may not displace float 30 a great distance and thus motion conversion device 60, 160 operates at a limited capacity, motion conversion device 100 can still operate at full capacity.

Figure 3:
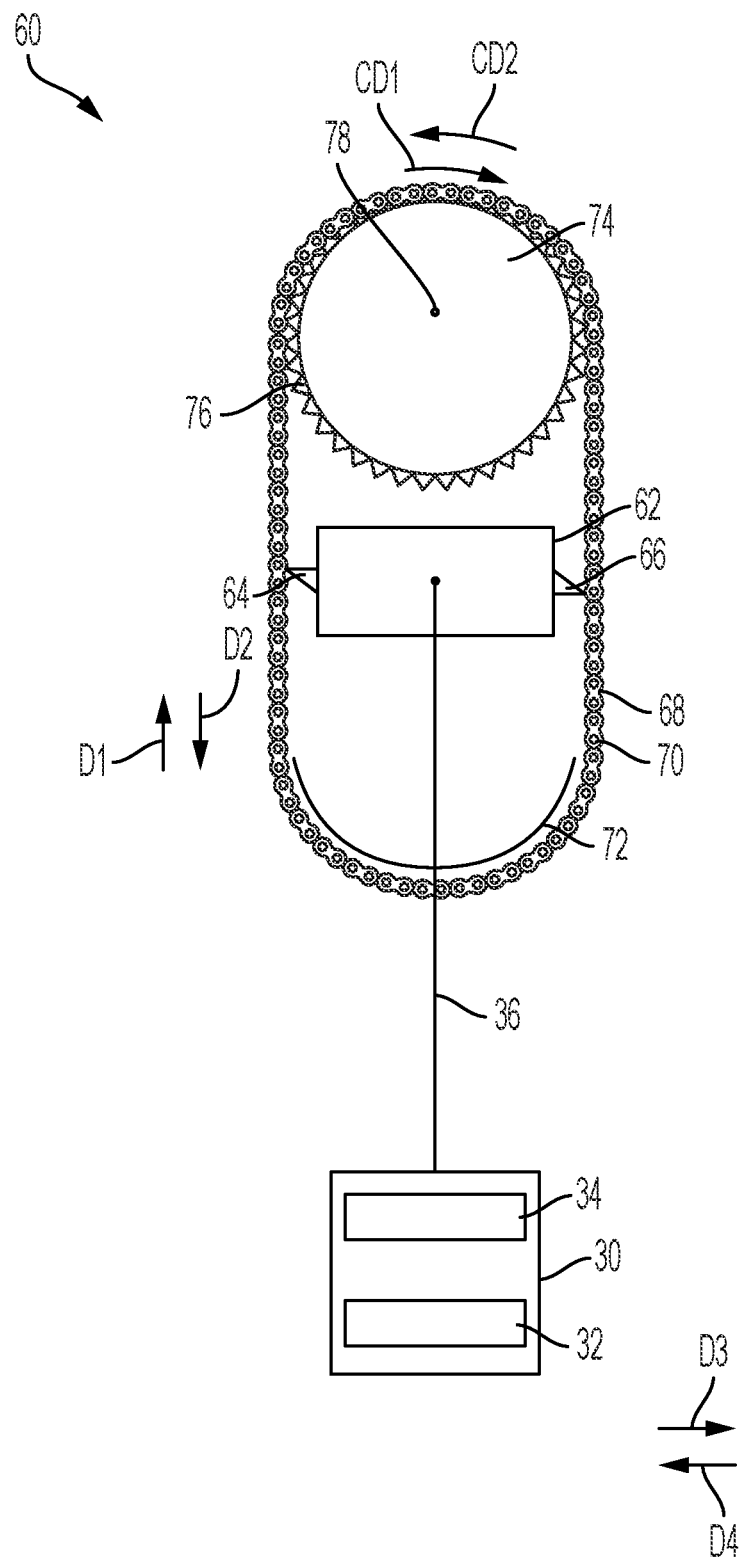
FIG. 3 is an elevational view of a motion conversion device.

FIG. 3 is an elevational view of motion conversion device or point absorber 60. Point absorber 60 is operatively arranged to displace shaft 80 in a single circumferential direction, for example, circumferential direction CD1. Point absorber 60 generally comprises float 30, reciprocating element 62, chain or belt or line 68, and sprocket or gear or wheel 74. It should be appreciated that a line as used herein may include a chain, belt, string, wire, strap, cable, or the like. Float 30 is arranged to engage the oscillating water column as previously described and displaces generally in direction D1 and direction D2. Reciprocating element 62 is connected to float 30 via shaft 36. In an exemplary embodiment, shaft 36 is pivotably connected to float 30. In an exemplary embodiment, shaft 36 is pivotably connected to reciprocating element 62.

Reciprocating element 62 is operatively arranged to be displaced generally in direction D1 and direction D2 (via float 30) and displace sprocket 74 in circumferential direction CD1. Reciprocating element 62 comprises pawl 64 and pawl 66. Pawls 64 and 66 are arranged to engage chain links 70 of chain 68. Specifically, pawl 64 is arranged to displace chain 68 when reciprocating element 62 is displaced in direction D1, but not displace chain 68 when reciprocating element 62 is displaced in direction D2. Pawl 66 is arranged to displace chain 68 when reciprocating element 62 is displaced in direction D2, but not displace chain 68 when reciprocating element 62 is displaced in direction D1. The arrangement of pawls 64 and 66 provide for constant displacement of chain 68, and thus sprocket 74, in a single direction regardless of the displacement direction of reciprocating element 62. In an exemplary embodiment, chain 68 is a polymer chain. In an exemplary embodiment, element 68 is a notched belt, wherein pawls 64 and 66 engage notches in notched belt 68 as described above.

Sprocket 74 comprises teeth 76 engaged with chain links 70 of chain 68. In an exemplary embodiment, point absorber 60 further comprises surface 72 engaged with chain 68. In an exemplary embodiment, surface 72 is a curvilinear plane slidably engaged with chain 68 to maintain tension within chain 68. In an exemplary embodiment, alternative or in addition to surface 72, point absorber 60 comprises another sprocket to maintain tension within chain 68. Sprocket 74 is non-rotatably connected to generator 90 through shaft 80. Specifically, sprocket 74 is connected to shaft 80 via freewheel connection 78. As reciprocating element 62 is displaced in direction D1 and direction D2, sprocket 74 and thus shaft 80 is displaced in circumferential direction CD1, thereby providing the motive power to generator 90 for conversion into electric power.

Figure 4:
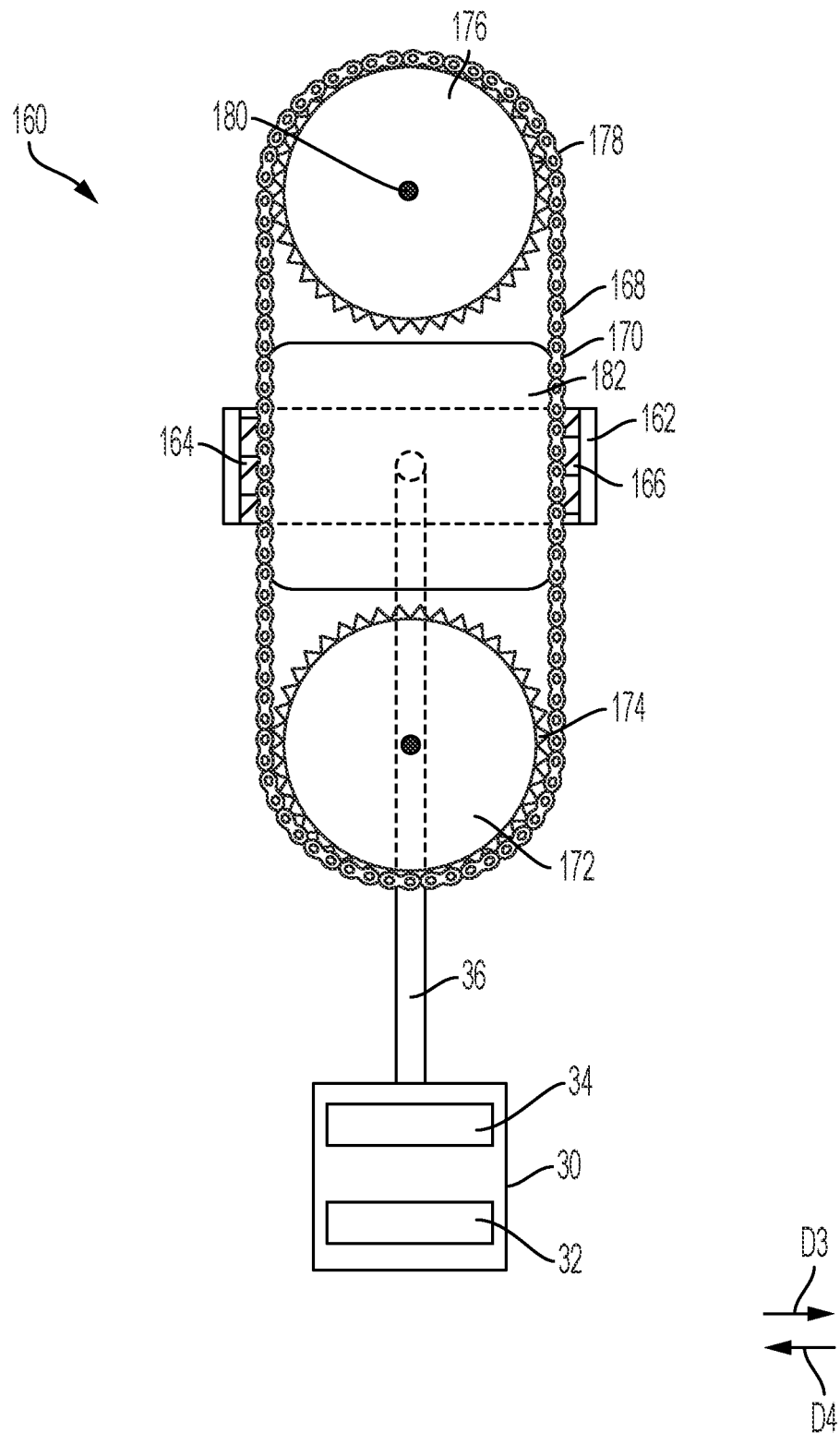
FIG. 4 is an elevational view of a motion conversion device.

FIG. 4 is an elevational view of motion conversion device or point absorber 160. Point absorber 160 is operatively arranged to displace shaft 80 in a single circumferential direction, for example, circumferential direction CD1. Point absorber 160 generally comprises float 30, reciprocating element 162, chain or belt or line 168, sprocket or gear or wheel 172, and sprocket or gear or wheel 176. Float 30 is arranged to engage the oscillating water column as previously described and displaces generally in direction D1 and direction D2. Reciprocating element 162 is connected to float 30 via shaft 36. In an exemplary embodiment, shaft 36 is pivotably connected to float 30. In an exemplary embodiment, shaft 36 is pivotably connected to reciprocating element 162.

Reciprocating element 162 is operatively arranged to be displaced generally in direction D1 and direction D2 (via float 30) and displace sprocket 176 in circumferential direction CD1. Reciprocating element 162 comprises one or more pawls 164 and one or more pawls 166. Pawls 164 and 166 are arranged to engage chain links 170 of chain 168. Specifically, pawls 164 are arranged to displace chain 168 when reciprocating element 162 is displaced in direction D1, but not displace chain 168 when reciprocating element 162 is displaced in direction D2. Pawls 166 are arranged to displace chain 168 when reciprocating element 162 is displaced in direction D2, but not displace chain 168 when reciprocating element 162 is displaced in direction D1. The arrangement of pawls 164 and 166 provide for constant displacement of chain 168, and thus sprocket 176, in a single direction regardless of the displacement direction of reciprocating element 162. In an exemplary embodiment, chain 168 is a polymer chain. In an exemplary embodiment, element 168 is a notched belt, wherein pawls 164 and 166 engage notches in notched belt 168 as described above.

Sprocket 176 comprises teeth 178 engaged with chain links 170 of chain 168. In an exemplary embodiment, point absorber 160 further comprises sprocket 174 engaged with chain 168. Sprocket 174 is operatively arranged to engage chain 168 to maintain tension within chain 168. In an exemplary embodiment, alternative or in addition to sprocket 174, point absorber 160 comprises a surface slidably engaged with chain 168 to maintain tension within chain 168. Sprocket 176 is non-rotatably connected to generator 90 through shaft 80. Specifically, sprocket 176 is connected to shaft 80 via freewheel connection 180. As reciprocating element 162 is displaced in direction D1 and direction D2, sprocket 176 and thus shaft 80 is displaced in circumferential direction CD1, thereby providing the motive power to generator 90 for conversion into electric power.

As shown in FIG. 4, pawls 164 and 166 engage a radially outward facing side of chain 170. However, pawls 164 and 166 may be arranged to engage a radially inward facing side of chain 170, as shown in FIG. 3. In an exemplary embodiment, point absorber 160 may further comprise spacer 182 operatively arranged to engage a radially inward facing side of chain 170. Spacer 182 facilitates linear motion of reciprocating element 162 and thus increases the efficiency of point absorber 160. For example, since line 168 is likely to be non-rigid (i.e., flexible), reciprocating element 162 may displace in directions D3 and D4 thereby imparting forces on line 168. This can lead to failure of line 168 and/or loss of energy, as well as failure of pawls to adequately engage or disengage line 168. The arrangement of spacer 182 prevents the lateral movement of reciprocating element 162.

It should be appreciated that various materials may be used for elements of the assemblies disclosed here, for example, polymers, synthetic fibers, duplex steel, etc. Such materials are resistant to corrosion from water and salt water. Certain materials are also lighter and less prone to rust.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

2 Water or fluid
4 Wall
10 Wave energy capture and conversion assembly
12 Wave energy capture and conversion assembly
20 Tube
22 Chamber
24 Section
26 Section
28 Opening
30 Float
32 Ballast or weight
34 Magnet(s)
36 Shaft
40 Linear generator or alternator
42 Coil
60 Motion conversion device or point absorber
62 Reciprocating element
64 Pawl
66 Pawl
68 Chain or belt or line
70 Chain links
72 Surface
74 Sprocket or gear or wheel
76 Teeth
78 Connection
80 Shaft 82 End
84 End
86 Flywheel
90 Generator
92 Generator
94 Power lines
100 Motion conversion device
102 Propeller
104 Propeller
106 Shaft
108 Shaft
110 Connection
160 Motion conversion device or point absorber
162 Reciprocating element
164 Pawl(s)
166 Pawl(s)
168 Chain or belt or line
170 Chain links
172 Sprocket or gear or wheel
174 Teeth
176 Sprocket or gear or wheel
178 Teeth
180 Connection
182 Spacer
CD1 Circumferential direction
CD2 Circumferential direction
D1 Direction
D2 Direction
D3 Direction
D4 Direction
H1 Height
H2 Height
W1 Width
W2 Width

What is claimed is:

1. A wave energy capture and conversion assembly, comprising:
a tube forming a chamber; and
a point absorber arranged in the chamber, the point absorber including:
a float;
a wheel;
a reciprocating element pivotably connected to the float, the reciprocating element being displaceable generally in a first linear direction toward the wheel and a second linear direction away from the wheel; and
a line at least partially wrapped around the wheel and engaged with the reciprocating element;
wherein:
the tube is operatively arranged to engage water to form an oscillating water column within the chamber; and
the oscillating water column engages the point absorber to displace a first shaft in a first circumferential direction.

2. The assembly as recited in claim 1, wherein the chamber comprises:
a first section comprising an opening; and
a second section connected and arranged substantially perpendicular to the first section, the point absorber being arranged in the second section.

3. The assembly as recited in claim 2, wherein the first section is arranged substantially horizontal and the second section is arranged substantially vertical.

4. The assembly as recited in claim 2, wherein the first section decreases in width in a first direction from the opening.

5. The assembly as recited in claim 4, wherein the first section decreases in height in the first direction.

6. The assembly as recited in claim 2, wherein the opening comprises an ovular geometry.

7. The assembly as recited in claim 1, wherein the float is operatively arranged to engage the oscillating water column and displace axially in the chamber.

8. The assembly as recited in claim 1, further comprising a linear generator including:
a magnet arranged in or on the float; and
a coil concentrically arranged around the magnet.

9. The assembly as recited in claim 1, wherein the reciprocating element comprises at least one pawl operatively arranged to:
engage the line as the reciprocating element is displaced in a first direction; and
disengage the line as the reciprocating element is displaced in a second direction, opposite the first direction.

10. The assembly as recited in claim 9, wherein the reciprocating element comprises:
a first pawl operatively arranged to:
engage the line as the reciprocating element is displaced in the first direction; and
disengage the line as the reciprocating element is displaced in the second direction; and
a second pawl operatively arranged to:
disengage the line as the reciprocating element is displaced in the first direction; and
engage the line as the reciprocating element is displaced in the second direction.

11. The assembly as recited in claim 9, wherein the at least one pawl engages a radially outward facing surface of the line.

12. The assembly as recited in claim 11, wherein the point absorber further comprises a spacer engaged with a radially inward facing surface of the line.

13. The assembly as recited in claim 9, wherein the at least one pawl engages a radially inward facing surface of the line.

14. The assembly as recited in claim 1, wherein the first shaft is connected to a rotary generator.

15. The assembly as recited in claim 1, further comprising a motion conversion device including:
a plurality of propellers arranged in the chamber, wherein the plurality of propellers are operatively arranged to displace a second shaft circumferentially.

16. A wave energy capture and conversion assembly, comprising:
a tube forming a chamber, the chamber including a first section comprising an opening and a second section; and
a point absorber arranged in the second section, the point absorber including:
a float axially displaceable within the second section, the float connected to a first end of a first shaft;
a reciprocating element pivotably connected to a second end of the first shaft;
a wheel connected to a second shaft; and
a line engaged with the wheel and the reciprocating element;
wherein:
the tube is operatively arranged to engage water to form an oscillating water column within the chamber; and
the oscillating water column is operatively arranged to displace the point absorber axially to displace the second shaft in a first circumferential direction.

17. The assembly as recited in claim 16, wherein the first section decreases in geometry in a first direction from the opening.

18. The assembly as recited in claim 16, wherein the second section is arranged substantially perpendicular to the first section.

19. A wave energy capture and conversion assembly, comprising:
- a tube forming a chamber; and
- a point absorber arranged in the chamber, the point absorber including:
  - a float;
  - a reciprocating element pivotably connected to the float;
  - a wheel; and
  - a line engaged with the reciprocating element and the wheel;
- wherein:
  - the tube is operatively arranged to engage water to form an oscillating water column within the chamber;
  - the oscillating water column engages the point absorber to displace a first shaft in a first circumferential direction; and
  - the reciprocating element comprises at least one pawl operatively arranged to:
    - engage the line as the reciprocating element is displaced in a first direction; and
    - disengage the line as the reciprocating element is displaced in a second direction, opposite the first direction.

* * * * *